(12) United States Patent
Kawaguchi et al.

(10) Patent No.: US 6,229,090 B1
(45) Date of Patent: May 8, 2001

(54) WIRE HARNESS FIXING STRUCTURE IN AN INSTRUMENT PANEL

(75) Inventors: Kenichiro Kawaguchi; Naoto Kogure; Masataka Nishijima; Keizo Nishitani, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/323,119

(22) Filed: Jun. 1, 1999

(30) Foreign Application Priority Data

Jun. 17, 1998 (JP) .................................................. 10-170019

(51) Int. Cl.[7] ...................................................... H01B 1/00
(52) U.S. Cl. ........................................................ 174/72 A
(58) Field of Search ......................... 439/718; 174/72 A, 174/72 TR, 117 F, 95

(56) References Cited

U.S. PATENT DOCUMENTS 5,841,070 * 11/1998 Takiguchi et al. .................. 174/72 A

FOREIGN PATENT DOCUMENTS 3-203122 9/1991 (JP) .
5-77659 3/1993 (JP) .

* cited by examiner

Primary Examiner—Shawn Riley
(74) Attorney, Agent, or Firm—Sughrue, Mion, Zinn, Macpeak & Seas PLLC

(57) ABSTRACT

A wire harness fixing structure in an instrument panel, as well as an instrument panel, in which the wire harness can be easily fixed without the use of an adhesive or separate members such as clips, mounting error can be absorbed when fixing the wire harness, and water due to dew condensation and so on can be easily discharged. In the structure for fixing the wire harness (23) in an instrument panel (21), a harness fixing portion (25), including an opening (26) and a fixing portion (27), is provided at a harness installation passage (24) formed in parting engagement surfaces of upper and lower instrument panel members (2) and (22) jointly forming the instrument panel (21), and the harness fixing portion (25) fixes a wire harness (23) installed in the harness installation passage (24). The opening (26) of the harness fixing portion (25) serves as a discharge port for discharging water due to dew condensation, developing in the harness installation passage (24). The fixing portion (27) extends from one side edge (26a) of the opening (26), and is spaced predetermined distances from the other side edges (26b to 26d) of the opening (26).

18 Claims, 7 Drawing Sheets

WIRE HARNESS FIXING STRUCTURE IN AN INSTRUMENT PANEL

BACKGROUND OF THE INVENTION

1. Field of the Invention

This invention relates to a wire harness fixing structure in an instrument panel and also to an instrument panel. More specifically, the invention relates to a wire harness fixing structure in which a harness fixing portion, which enables the discharge of water, for example, resulting from dew condensation developing in a harness installation passage, is formed in the harness installation passage so as to fix a wire harness. The invention also relates to an instrument panel having such a fixing structure.

2. Related Art

FIG. 10 shows an instrument panel of a vehicle, such as an automobile, disclosed in Japanese Patent unexamined Publication No. 5-77659.

This instrument panel 1 comprises an upper instrument panel member 2 and a lower instrument panel member 3 both of which are made of a synthetic resin. A meter hood 4 is adapted to be mounted on the upper instrument panel member 2.

Air outlet ports 5 for defrosting purposes are formed in a front end portion of the upper instrument panel member 2, and air outlet ports 6 and 7 for air-conditioning purposes are formed respectively in opposite (right and left) side portions (with respect to the passenger room of the vehicle) and, a central portion of the upper instrument panel member 2. Covers 6a and 7a, each having an air blowout condition adjusting function (such as the direction and amount of the air), are provided respectively in the air outlet ports 6 and 7.

The upper instrument panel member 2 has a tray 8 for holding small articles. The meter hood 4 is adapted to be mounted on a mounting portion 9 formed at the upper instrument panel member 2, and meters (not shown), including a speedometer and a tachometer, are provided within this meter hood.

In FIGS. 10 and 11, an air duct 10 for air-conditioning purposes, an air duct 11 for defrosting purposes, and a harness installation passage 12 for receiving circuit members mounted on the instrument panel 1 (see FIG. 10) are formed in a parting engagement surface of the lower instrument panel member 3 for engagement with the upper instrument panel member 2 (see FIG. 10). Each of the air ducts 10 and 11 and the harness installation passage 12 has a channel-shaped cross-section. An air introducing port 13 for introducing the air from an air-conditioning unit (not shown) is formed at the air duct 10. Similarly, an air introducing port 14 is formed in the air duct 11.

In the example shown in FIG. 10, electrically-conductive stripes, corresponding to a wire harness, are coated or printed directly on the harness installation passage 12.

As shown in FIG. 12, air ducts 16 and 17 and a harness installation passage 18, corresponding respectively to the air ducts 10 and 11 (see FIG. 11) and the harness installation passage 12 (see FIG. 11), are formed in a parting engagement surface of the upper instrument panel member 2 for engagement with the lower instrument panel member 3. When the upper and lower instrument panel members 2 and 3 are engaged with each other, the various ducts and the passage are formed. In the above conventional technique, the instrument panel 1 has a two-piece construction, that is, the upper instrument panel member 2 and the lower instrument panel member 3, as shown in FIG. 10. Therefore, the air ducts 10 (16) and 11 (17) and the harness installation passage 12 (18) can be formed integrally in the instrument panel member by molding. Also, with respect to the air ducts 10 (16) and 11 (17) for example, a connection tube or a bellows tube for the air duct is not required. Thus the assembling process is simplified.

On the other hand, the harness installation passages 12 and 18 are formed along the air ducts 10 and 16, respectively, as shown in FIG. 13. Therefore, even if care is taken so as to prevent the air from leaking from the air ducts 10 and 16 through a portion indicated by arrow P, there is a possibility that dew condensation will develop on the inner surfaces of the harness installation passages 12 and 18 because of a change of the ambient temperature (to which the instrument panel 1 is subjected) and the temperature difference between the air ducts 10 and 16 and the harness installation passages 12 and 18.

Water, resulting from this condensation, will collect in the harness installation passages 12 and 18, which is undesirable from the electrical point of view.

The electrically-conductive stripes 15 are provided in the harness installation passage 12 (18) as shown in FIG. 10. However, in the case where a wire harness 19 is installed as shown in FIG. 13, this wire harness 19 needs to be fixed so that it will not be dislodged. More specifically, in order to suppress the shaking of the wire harness 19 due to vibrations developing during the travel of the vehicle, the wire harness 19 must be fixed by bonding it directly to the instrument panel member or by using protectors or clips (not shown) attached in advance to the wire harness 19.

Therefore, the number of the component parts increases, so that the mounting operation is complicated.

Further, in the case of using the above protectors or the clips (not shown), a certain degree of dimensional accuracy is required when manufacturing the wire harness 19 so that the protectors or the clips can be mounted respectively on predetermined portions of the wire harness. Therefore, the mounting operation is further complicated, and this affects the productivity.

SUMMARY OF THE INVENTION

With the above problems in view, it is an object of this invention to provide a wire harness fixing structure in an instrument panel, as well as an instrument panel, in which a wire harness can be fixed without the use of an adhesive and separate members such as clips, the mounting error can be absorbed when fixing the wire harness, and water due to dew condensation and the like can be easily discharged.

The above problems have been solved by a wire harness fixing structure in an instrument panel, wherein a harness installation passage of a generally channel-shaped cross-section for receiving a wire harness, installed on the instrument panel, is formed in parting engagement surfaces of upper and lower instrument panel members jointly forming the instrument panel, and the wire harness is fixed to the harness installation passage; characterized in that a harness fixing portion is provided at the harness installation passage, and the harness fixing portion includes an opening, and a fixing portion extending from one side edge of the opening and spaced predetermined distances from the other side edges of the opening, the opening serving also as a discharge port for discharging water due to dew condensation, developing in the harness installation passage. Further, the portion of the wire harness, disposed at the harness fixing portion, is bent into a generally U-shape, and is received in the opening, so that the fixing portion holds the bent portion of the wire harness, thereby fixing the wire harness to the harness installation passage.

In the above wire harness fixing structure in the instrument panel, the harness fixing portion, including the opening and the fixing portion, is provided at the harness installation passage formed in the parting engagement surfaces of the upper and lower instrument panel members jointly forming the instrument panel, and the harness fixing portion fixes the wire harness installed in the harness installation passage.

The opening of the harness fixing portion serves also as the discharge port for discharging water due to dew condensation, developing in the harness installation passage. The fixing portion extends from one side edge of the opening, and is spaced predetermined distances from the other side edges of the opening.

With this fixing structure, separate members, such as clips, do not need to be attached to the wire harness in advance , so that the productivity of the wire harness is enhanced. Further, the complicated mounting operation as required in the conventional construction is eliminated. Therefore, there is naturally no requirement for the dimensional accuracy of such separate members.

The harness fixing portion has the simple construction as described above, and the fixing portion holds the wire harness received in the opening in a bent manner. Therefore, by adjusting the bent position of the wire harness, a mounting error can be easily absorbed when fixing the wire harness.

Further, the opening serves also as the discharge port, and therefore water will not collect in the harness installation passage.

Therefore, the wire harness can be easily fixed without the use of an adhesive and separate members, a mounting error can be absorbed when fixing the wire harness, and water due to dew condensation and so on can be easily discharged.

According to another aspect of the invention, the fixing portion has a projection for preventing the disengagement of the wire harness. Also, the fixing portion has a rectangular shape. Therefore, the fixing portion can be formed so as to have a thickness corresponding to that of a wall of the harness installation passage, and the moldability is enhanced. Further, the fixing portion has elasticity. Therefore, when fixing the wire harness, the wire harness can be easily mounted while flexing the fixing portion. Further, vibrations and so on, transmitted to the wire harness during the travel, can be absorbed by the elasticity of the fixing portion.

According to another aspect of the invention, stoppers for supporting that portion of the wire harness, bent and received in the opening, are provided in facing relation to the opening. Therefore, when fixing the wire harness, the operator can effect the operation stabley. Also, the stoppers prevent the bent portion of the wire harness from interfering with other members.

At least one harness fixing portion, described above, is provided at that portion of the harness installation passage disposed in the vicinity of an air duct. Thus, the harness fixing portion is provided at that portion where dew condensation is likely to develop, that is, at that portion where the temperature difference due to the air, flowing through the air duct, is likely to be the greatest, and therefore water can be discharged through the opening, thereby positively preventing water from collecting in the harness installation passage.

DETAILED DESCRIPTION OF THE INVENTION

Figure 1A:
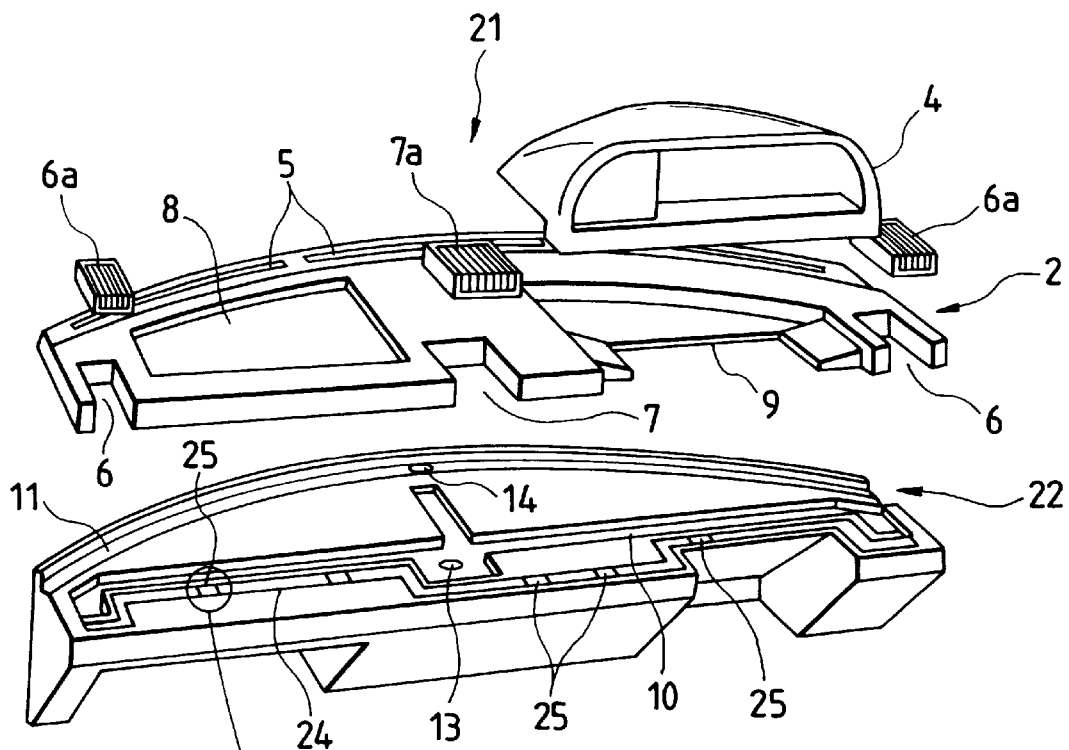
FIG. 1(a) is a perspective view showing one preferred embodiment of a wire harness fixing structure of the invention in an instrument panel, as well as an instrument panel of the invention
Figure 1B:
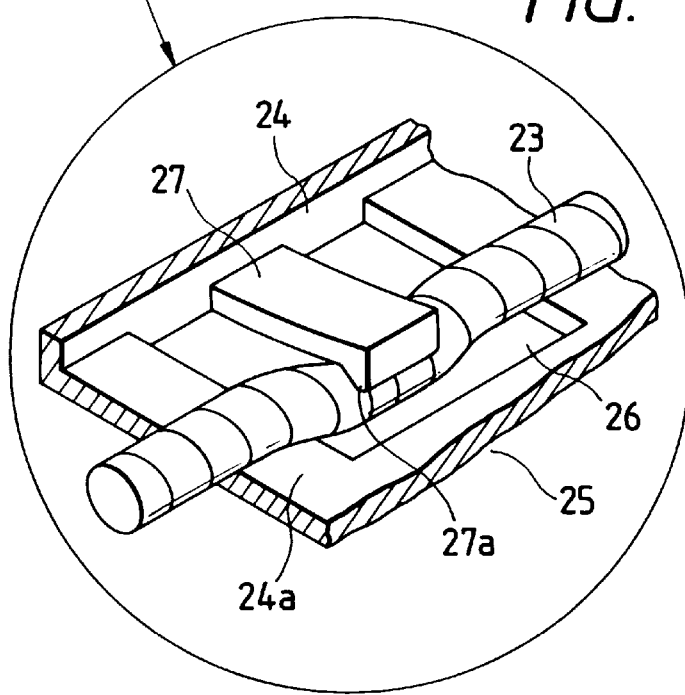
FIG. 1(b) is an exploded view thereof.
Figure 2:
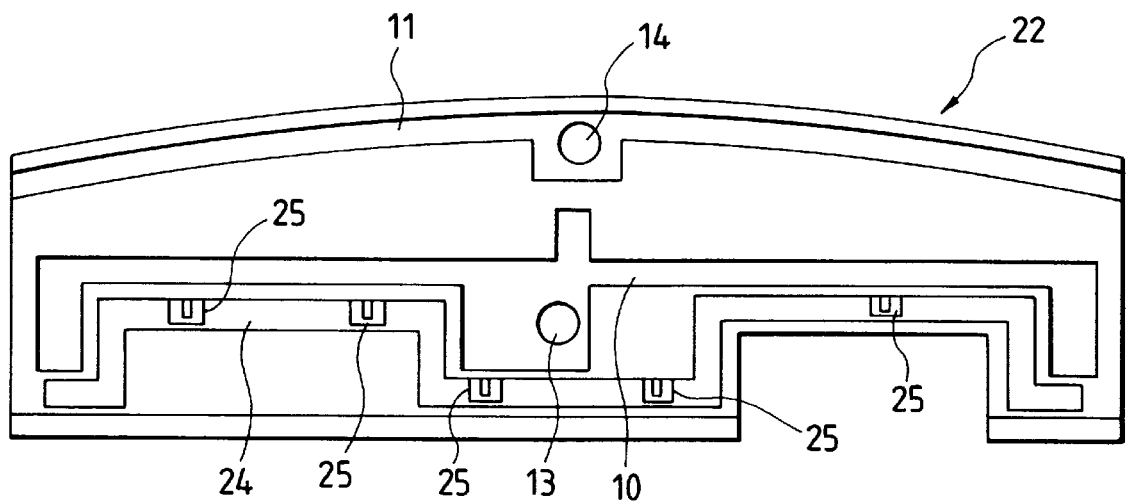
FIG. 2 is a plan view of a lower instrument panel member of FIG. 1.
Figure 3:
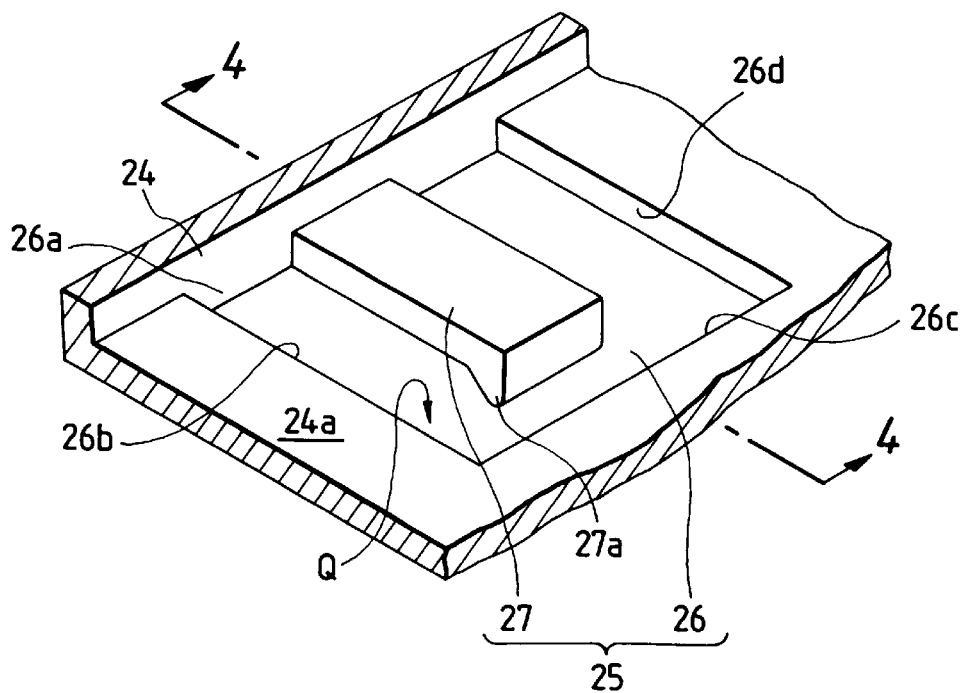
FIG. 3 is an enlarged, perspective view of a harness fixing portion of FIG. 2.
Figure 4:
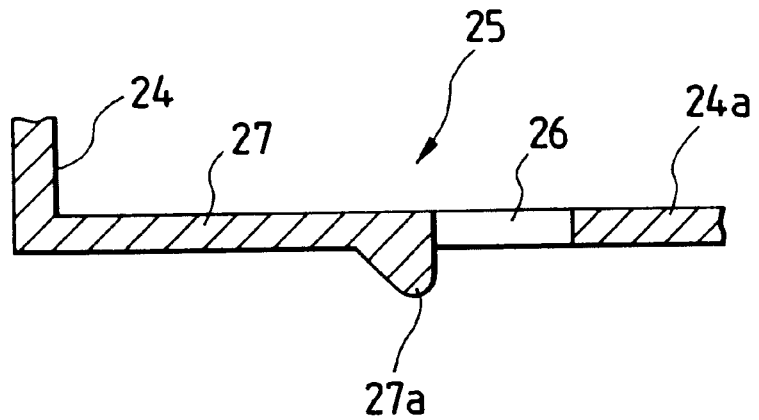
FIG. 4 is a cross-sectional view taken along the line 4—4 of FIG. 3.
Figure 5:
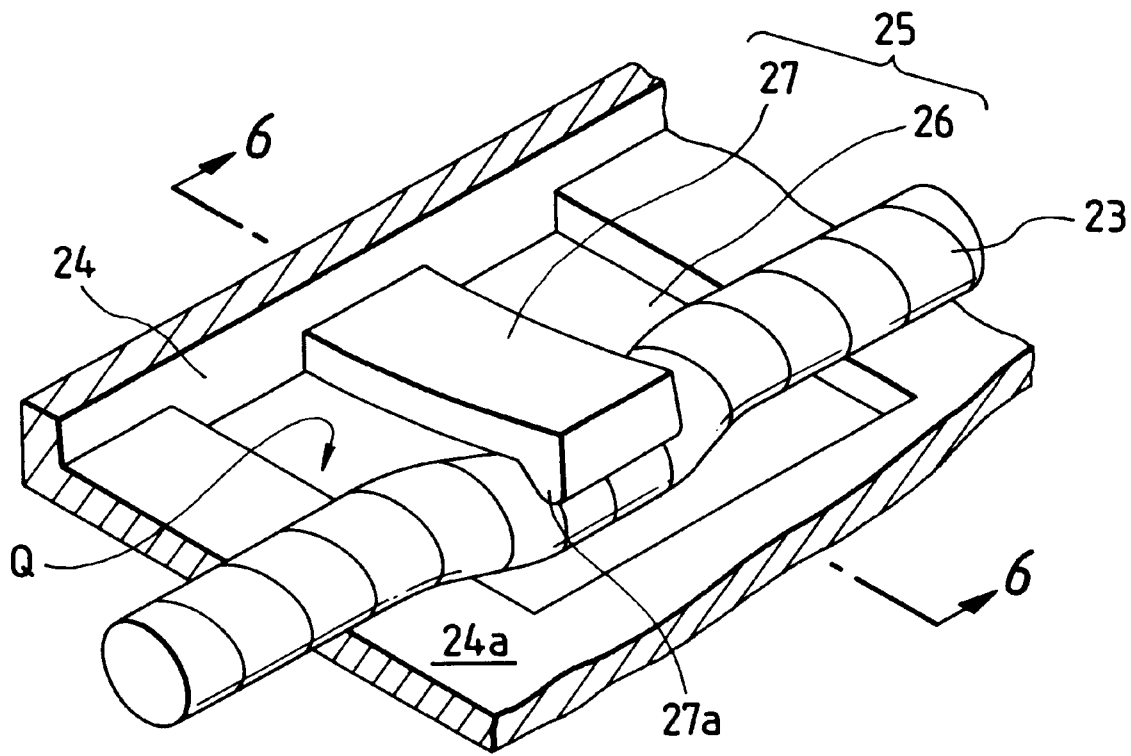
FIG. 5 is an enlarged, perspective view of the harness fixing portion of FIG. 1.
Figure 6:
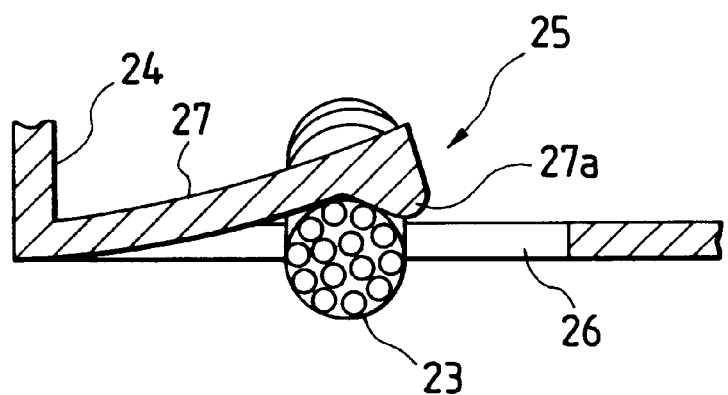
FIG. 6 is a cross-sectional view taken along the line 6—6 FIG. 5.
Figure 7:
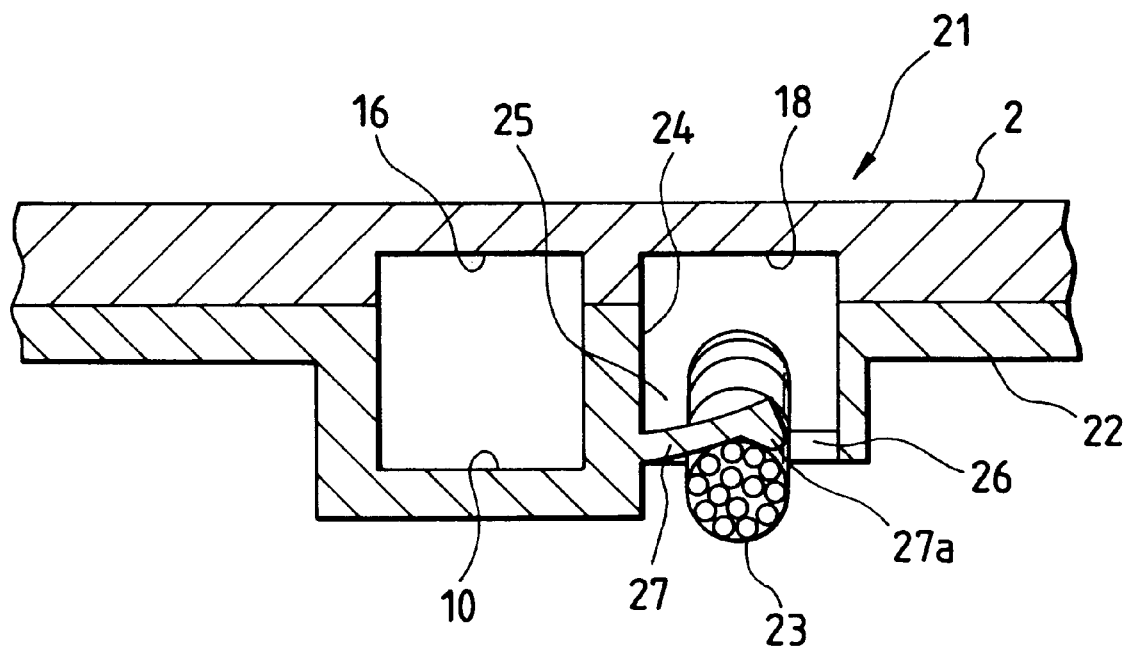
FIG. 7 is a cross-sectional view showing a fixed condition of a wire harness in the instrument panel of FIG. 1.

A preferred embodiment of the present invention will now be described with reference to the drawings. FIG. 1(a) is a perspective view showing one preferred embodiment of a wire harness fixing structure of the invention, as well as an instrument panel of the invention and FIG. 1(b) is an exploded view of the fixing portion. FIG. 2 is a plan view of a lower instrument panel member of FIG. 1. FIG. 3 is an enlarged, perspective view of a harness fixing portion of FIG. 2, FIG. 4 is a cross-sectional view taken along the line 4—4 of FIG. 3, FIG. 5 is an enlarged, perspective view of the harness fixing portion of FIG. 1, FIG. 6 is a cross-sectional view taken along the line 6—6 of FIG. 5, and FIG. 7 is a cross-sectional view showing a fixed condition of a wire harness in the instrument panel of FIG. 1

Figure 8:
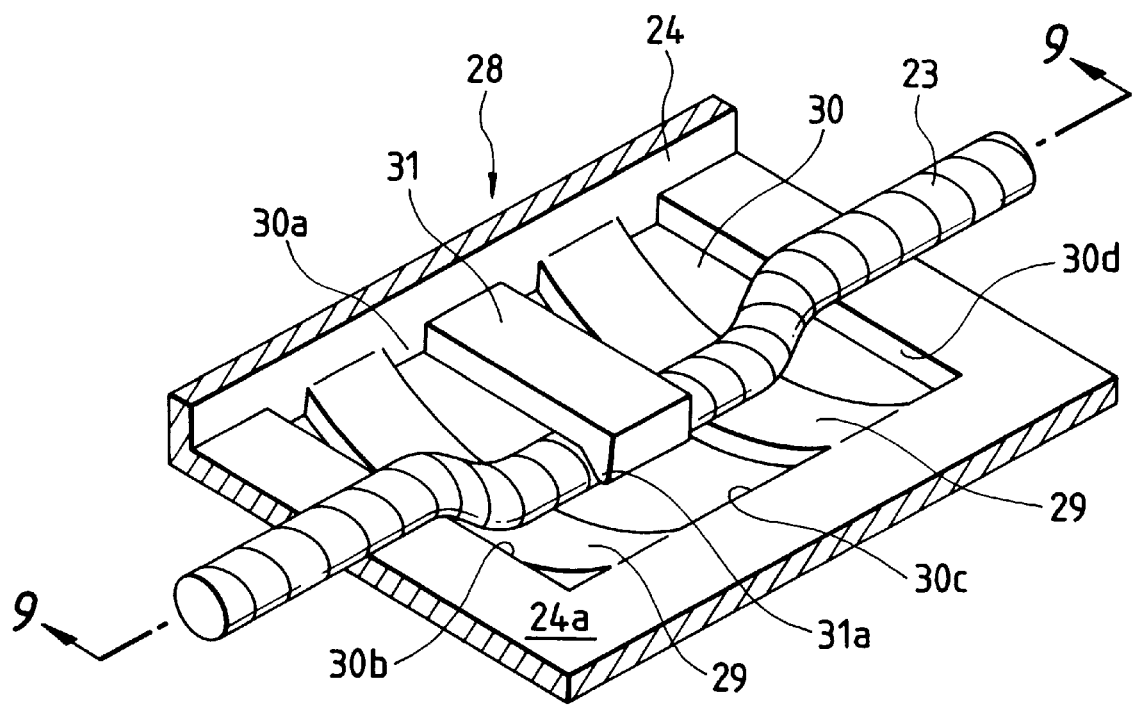
FIG. 8 is a perspective view showing another embodiment of a wire harness fixing structure of the invention in an instrument panel.
Figure 9:
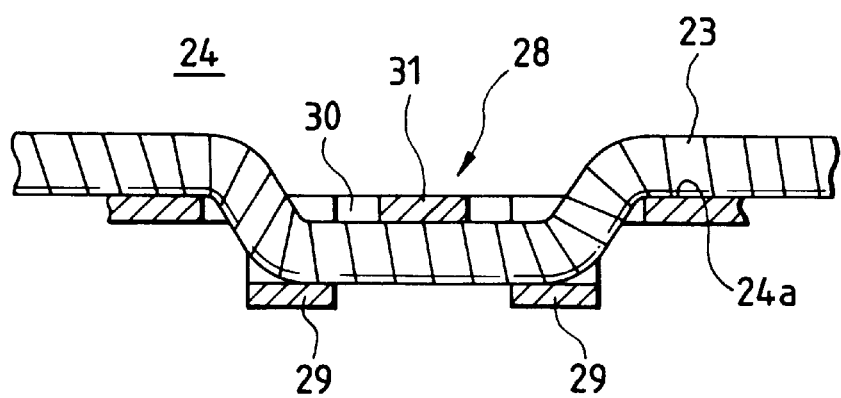
FIG. 9 is a cross-sectional view taken along the line 9—9 of FIG. 8.
Figure 10:
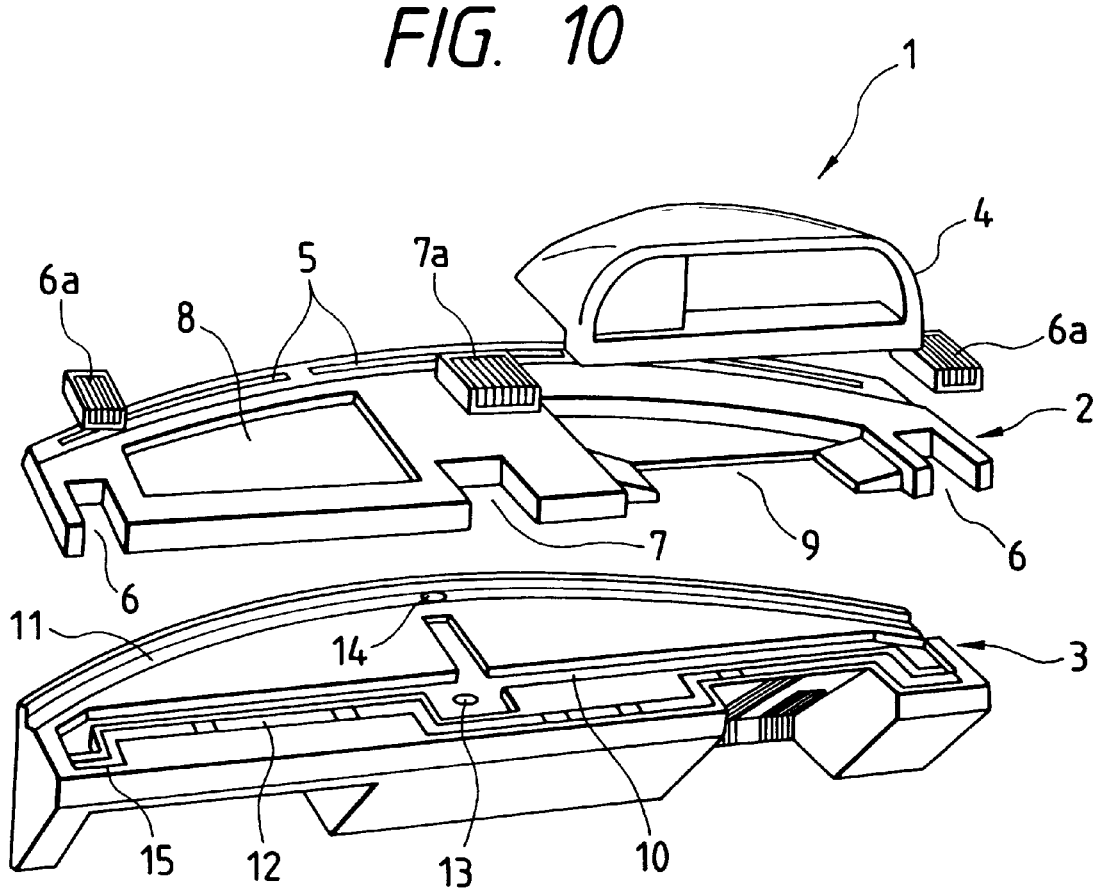
FIG. 10 is an exploded, perspective view of a conventional instrument panel.
Figure 11:
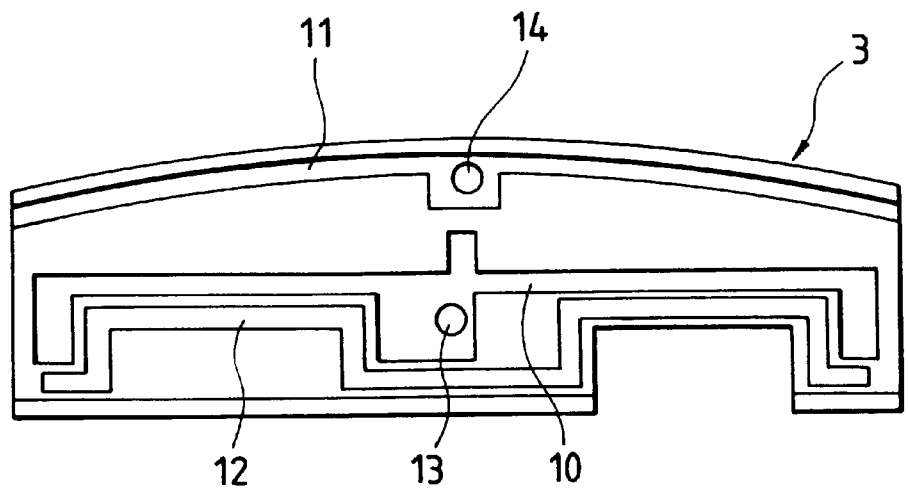
FIG. 11 is a plan view of a lower instrument panel member of FIG. 10.
Figure 12:
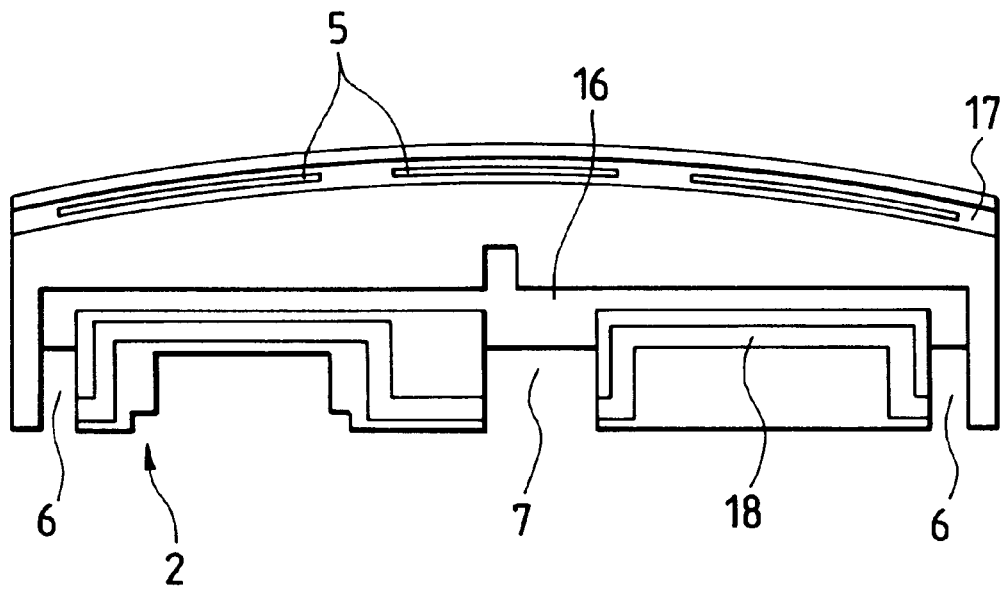
FIG. 12 is a plan view of an upper instrument panel member of FIG. 10.
Figure 13:
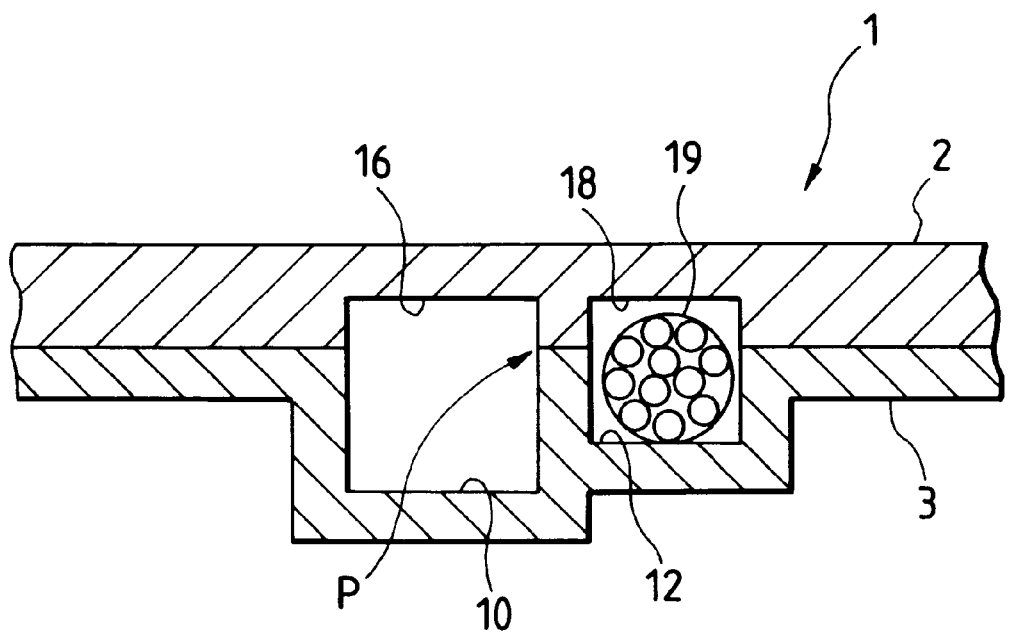
FIG. 13 is a cross-sectional view showing a fixed condition of a wire harness in the instrument panel of FIG. 10.

FIG. 8 is a perspective view showing another embodiment of a wire harness fixing structure of the invention in an instrument panel; and FIG. 9 is a cross-sectional view taken along the line 9—9 of FIG. 8.

Those portions of these embodiments basically identical to those of the conventional construction will be designated by identical reference numerals, respectively, and detailed description thereof will be omitted.

In FIG. 1, reference numeral 21 denotes the instrument panel to be mounted on a vehicle such as an automobile, and this instrument panel 21 comprises an upper instrument panel member 2 and the lower instrument panel member 22 both of which are made of a synthetic resin. As in the conventional construction, a meter hood 4, containing meters (not shown), including a speedometer and a tachometer, is adapted to be mounted on the upper instrument panel member 2 through a mounting portion 9 formed at this upper instrument panel member 2.

The upper instrument panel member 2 has the same construction as that of the conventional member, and therefore explanation thereof will be omitted here. The meter hood 4 may be molded integrally with the upper instrument panel member, in which case the meters are mounted later within this meter hood.

In FIGS. 1 and 2, an air duct 10 for air-conditioning purposes, an air duct 11 for defrosting purposes, and a harness installation passage 24 for receiving the wire harness 23 installed on the instrument panel 21 (see FIG. 1(*a*)) are formed in a parting engagement surface of the lower instrument panel member 22 for engagement with the upper instrument panel member 2. Each of the air ducts 10 and 11 and the harness installation passage 24 has a channel-shaped cross-section. An air introducing port 13 for introducing the air from an air-conditioning unit (not shown) is formed in the air duct 10. Similarly, an air introducing port 14 is formed in the air duct 11.

Harness fixing portions 25 are provided at those portions of the harness installation passage 24, disposed adjacent to the air duct 10, where dew condensation is liable to develop, and at other suitable portion of the harness installation passage 24. As shown in FIG. 1(*b*), the wire harness 23 is fixed by these harness fixing portions 25.

As shown in FIG. 3, the harness fixing portion 25 includes an opening 26 of a rectangular shape formed through a bottom wall 24*a* of the harness installation passage 24, and a fixing portion 27 of a rectangular shape extending from one side edge 26*a* of the opening 26 and spaced predetermined distances (which do not need to be equal to each other) from the other side edges 26*b* to 26*d* of the opening 26. Water, for example, resulting from dew condensation developing in the harness installation passage 24, can be discharged through this opening 26 to that portion (as indicated by arrow Q) which is disposed inwardly (or downwardly) of the lower instrument panel member 22 (see FIG. 2), and faces the opening 26.

The fixing portion 27 has elasticity, and in view of moldability, the fixing portion 27 has the same thickness as that of the bottom wall 24*a*. The fixing portion 27 is disposed in a plane in which the bottom wall 24*a* lies, as shown in FIGS. 3 and 4. A projection 27*a* of a generally semi-circular cross-section is formed at a distal end of the fixing portion 27 over an entire width thereof, and projects downwardly.

The fixing portion 27 may be rigid, and may have a rectangular or round cross-section, or the like. If the fixing portion 27 has elasticity as described above, vibrations and so on, transmitted to the wire harness 23 during the travel, can be absorbed through the elasticity of the fixing portion 27.

In the above construction, the fixing of the wire harness 23 to the harness fixing portion 25 will be described with reference to FIGS. 5 to 7.

First, the wire harness 23 is installed or arranged along the bottom wall 24*a* of the harness installation passage 24, and then that portion of the wire harness 23, disposed at the harness fixing portion 25, is pressed to be received in the opening 26 in a bent manner.

At this time, the wire harness is pressed by the deflected fixing portion 27 so that the fixing portion 27 holds the wire harness 23 in place. Because of the provision of the projection 27*a*, the wire harness 23 will not be easily disengaged from the harness fixing portion 25 by vibrations and so on during travel.

As described above with reference to FIGS. 1 to 7, when the above fixing structure and the instrument panel 21 are used, there is no need to use separate members (e.g. clips) attached in advance to the wire harness, as in the conventional construction. Therefore, the productivity of the wire harness 23 enhanced, and the complicated mounting operation required in the conventional construction is eliminated. Therefore, there is naturally no requirement for the dimensional accuracy of such separate members.

The harness fixing portion 25 has the simple construction described above, and the fixing portion 27 holds the wire harness 23 received in the opening in a bent manner. Therefore, by adjusting the bent position of the wire harness 23, mounting error can be easily absorbed when fixing the wire harness. Further, the opening 26 serves also as the discharge port, and therefore water will not be collected in the harness installation passage 24.

Therefore, the present invention allows the wire harness 23 to be easily fixed without the use of an adhesive and the above-mentioned separate fixing members, mounting error can be absorbed when fixing the wire harness, and water due to dew condensation and so on can be easily discharged.

Next, a modified harness fixing portion of the present invention will be described with reference to FIGS. 8 and 9.

The harness fixing portion 28, shown in FIGS. 8 and 9, is identical in construction to the harness fixing portion 25 (see FIG. 1(*a*)) except that stoppers 29 and 29 are added. The harness fixing portion 28 includes an opening 30 of a rectangular shape formed through the bottom wall 24*a* of the harness installation passage 24. In addition, an elastic fixing portion 31 of a rectangular shape extends from one side edge 30*a* (see FIG. 8) of the opening 30 and is spaced predetermined distances (which do not need to be equal to each other) from the opposite side edges 30*b* to 30*d* (see FIG. 8) of the opening 30. Finally, the stoppers 29 and 29 of a rectangular shape, are disposed respectively on opposite sides of the fixing portion 31, and extend between the side edges 30*a* and 30*c* (see FIG. 8), and are curved toward that side disposed inwardly of the lower instrument panel member 22 (see FIG. 1(*a*)).

In view of moldability, the fixing portion 31 has the same thickness as that of the bottom wall 24*a*, and is disposed in the plane in which the bottom wall 24*a* lies. Similarly, the stoppers 29 and 29 have the same thickness as that of the bottom wall 24*a* (see FIG. 9). A projection 31*a* (see FIG. 8) of a generally semi-circular cross-section is formed at a distal end of the fixing portion 31 over an entire width thereof, and is formed on a bottom surface of the fixing portion 31 that is directed toward that side disposed inwardly of the lower instrument panel member 22 (see FIG. 1(*a*)).

When fixing the wire harness 23 by the harness fixing portion 28 of this construction in a manner described above for the harness fixing portion 25 (see FIGS. 5 to 7), the wire harness 23 will not be excessively bent because of the provision of the stoppers 29 and 29. Therefore there is achieved an advantage that the operation can be carried out in a more stable manner.

Because of the provision of the stoppers 29 and 29, the bent portion of the wire harness 23, projected toward that side disposed inwardly of the lower instrument panel member 22 (see FIG. 1), will not interfere with other members.

Like the fixing portion 31, the stoppers 29 and 29 can be supported in a cantilever manner.

In the present invention, various modifications can be made within the scope of the invention.

As described above, in the wire harness fixing structure of the invention in the instrument panel, the harness fixing portion, including the opening and the fixing portion, is provided at the harness installation passage formed in the parting engagement surfaces of the upper and lower instrument panel members jointly forming the instrument panel, and the harness fixing portion fixes the wire harness installed in the harness installation passage.

The opening of the harness fixing portion also serves as the discharge port for discharging water due to dew condensation, developing in the harness installation passage, and so on. The fixing portion extends from one side edge of the opening, and is spaced predetermined distances from the other side edges of the opening.

That portion of the wire harness, disposed at the harness fixing portion, is bent into a generally U-shape, and is received in the opening, so that the fixing portion holds the bent portion of the wire harness, thereby fixing the wire harness.

With this fixing structure, separate members, such as clips, do not need to be attached beforehand to the wire harness, and the productivity of the wire harness is enhanced. Further, the complicated mounting operation as required in the conventional construction is eliminated. Therefore, there is naturally no requirement for the dimensional accuracy of such separate members.

The harness fixing portion has a simple construction as described above, and the fixing portion holds the wire harness received in the opening in a bent manner. Therefore, by adjusting the bending position of the wire harness, a mounting error can be easily absorbed when fixing the wire harness. Further, the opening serves also as the discharge port, and therefore water will not be collected in the harness installation passage.

Therefore, there can be provided the wire harness fixing structure, in which the wire harness can be fixed without the use of an adhesive and separate members, mounting error can be absorbed when fixing the wire harness, and water due to dew condensation and so on can be easily discharged.

What is claimed is:

1. A wire harness fixing structure in an instrument panel including mating upper and lower panel members which together define a harness installation passage for receiving a wire harness, said fixing structure comprising:

a harness fixing portion provided in said harness installation passage, said harness fixing portion including an opening, and a fixing member extending from one side edge of said opening and spaced from the other side edges of said opening, said opening serving also as a discharge port for discharging water, wherein a portion of said wire harness disposed at said harness fixing portion is bent into a generally U-shape and is received in said opening, so that said fixing member holds the bent portion of said wire harness, thereby fixing said wire harness in said harness installation passage.

2. A wire harness fixing structure according to claim 1, wherein said fixing member includes a projection for preventing the disengagement of said wire harness from said fixing member.

3. A wire harness fixing structure according to claim 1, wherein said fixing portion has a rectangular shape.

4. A wire harness fixing structure according to claim 1, wherein said fixing member is elastic.

5. A wire harness fixing structure according to claim 1, further comprising a plurality of stoppers extending across said opening for supporting the bent portion of said wire harness.

6. A wire harness fixing structure according to claim 1, wherein said harness fixing portion is provided at that portion of said harness installation passage disposed proximate an air duct.

7. A wire harness fixing structure according to claim 1, further comprising a plurality of harness fixing portions spaced at intervals along said harness installation passage.

8. A wire harness fixing structure according to claim 2, wherein said fixing portion has a rectangular shape.

9. A wire harness fixing structure according to claim 8, wherein said fixing member is elastic.

10. A wire harness fixing structure according to claim 8, further comprising a plurality of stoppers extending across said opening for supporting the bent portion of said wire harness.

11. A wire harness fixing structure according to claim 8, wherein said harness fixing portion is provided at that portion of said harness installation passage disposed proximate an air duct.

12. A wire harness fixing structure according to claim 8, further comprising a plurality of harness fixing portions spaced at intervals along said harness installation passage.

13. An instrument panel, comprising:

mating upper and lower panel members which together define a harness installation passage for receiving a wire harness; and a harness fixing portion provided in said harness installation passage, said harness fixing portion including an opening and a fixing member extending from one side edge of said opening and spaced from the other side edges of said opening, said opening serving also as a discharge port for discharging water, wherein a portion of said wire harness disposed at said harness fixing portion is bent into a generally U-shape and is received in said opening, so that said fixing member holds the bent portion of said wire harness, thereby fixing said wire harness in said harness installation passage.

14. An instrument panel according to claim 13, wherein said fixing member includes a projection for preventing the disengagement of said wire harness from said fixing member.

15. An instrument panel structure according to claim 13, wherein said fixing portion has a rectangular shape.

16. An instrument panel according to claim 13, wherein said fixing member is elastic.

17. An instrument panel according to claim 13, further comprising a plurality of stoppers extending across said opening for supporting the bent portion of said wire harness.

18. An instrument panel according to claim 13, wherein said harness fixing portion is provided at that portion of said harness installation passage disposed proximate an air duct.

\* \* \* \* \*